UNITED STATES PATENT OFFICE.

THEODORE H. VIDETO, OF HUDSON, MASSACHUSETTS.

ART OF MAKING GOSSAMER WATER-PROOF FABRICS.

SPECIFICATION forming part of Letters Patent No. 431,712, dated July 8, 1890.

Application filed February 27, 1888. Renewed December 2, 1889. Serial No. 332,205. (No specimens.)

*To all whom it may concern:*

Be it known that I, THEODORE H. VIDETO, of Hudson, in the county of Middlesex and State of Massachusetts, have invented a new and useful Improvement in Art of Making Gossamer Water-Proof Fabrics, of which the following is a specification.

This invention involves a new and useful process or method of manufacturing gossamer water-proof fabrics, the novel feature consisting in supplementing by a roller-printing operation the steps heretofore practiced by me in making plain-surfaced, velvety, or dull-finished gossamer goods, such supplemental operation transferring to the otherwise finished surface, before vulcanizing, any desired figure the reverse of which is cut in the roller.

The product of this process is a water-proof fabric, having a velvety dull-finished surface as a background, and a suitable figure superimposed and printed thereon. I make no present claim thereto.

In carrying out my invention I proceed as follows: The web of textile fabric to be treated is in the form of an endless belt, supported upon rollers which distend and move it while a succession of extremely thin films of rubber compound in solution are applied to the outer surface by means of a broad straight-edged knife, in the manner generally practiced in coating gossamer goods. I then cover such coated surface thickly with powdered corn-starch or like farinaceous substance to obviate the tendency of the rubber surfaces to adhere, and I speedily remove the farina, first with a brush and afterward with a solution of paraffine in naphtha, as explained in my Letters Patent No. 375,234, granted December 20, 1887, for improvement in the art of making water-proof fabrics. This treatment set forth in my said patent was subsequent to the ornamentation or striping, and was the last act prior to removal of the fabric for vulcanization.

By my present improvement the process is changed in an important respect. After the surface has been cleansed by the bath of paraffine and naphtha, and before vulcanization, the desired ornamentation is given to the velvety dull-finished surface which the fabric then presents by printing the figure thereon with one or more revolving engraved rollers after the manner of calico-printing. In this way an ornamental figure in one or more colors or shades may be imprinted upon the dull-finished background, thus producing a very pleasing style of goods having the primary water-proof quality, and in addition thereto any desired figure in bright or dull colors imprinted with rubber in solution, or with other suitable printing compounds.

The printing operation is, by preference, performed before removal of the web from the rollers which support it while being coated, but when desired the goods may be removed and several pieces joined end to end run through the printing-machine—the non-adhesive surface permitting of rolling up and handling the fabric. After this the rubber compound is vulcanized either by solar or artificial heat, and the fabric is ready for use.

I claim as my invention—

The described improvement in the art of making water-proof fabrics, the same consisting in coating a web of fibrous material with successive films of rubber compound in solution, then dull-finishing the surface and rendering it non-adhesive by applying dry farinaceous material and removing the same, as described, and subsequently imprinting a desired figure upon such surface by means of a revolving roller, and vulcanizing the rubber, substantially as set forth.

In testimony whereof I have signed my name to this specification, in the presence of two subscribing witnesses, on this 21st day of February, A. D. 1888.

THEO. H. VIDETO.

Witnesses:
A. H. SPENCER,
ELIHU G. LOOMIS.